UNITED STATES PATENT OFFICE.

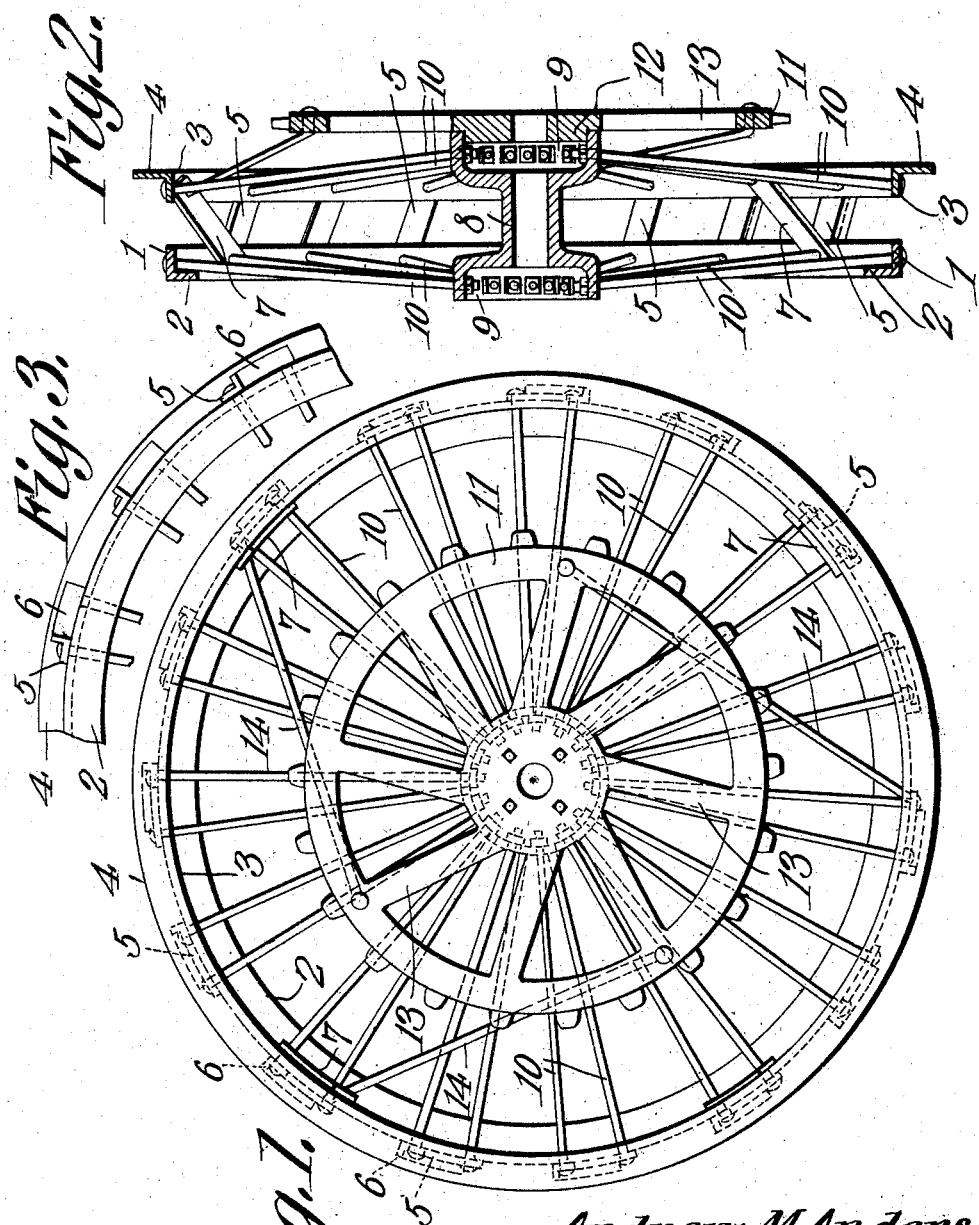

ANDREW M. ANDERSON AND CORNELIUS QUESNELL, OF MOSCOW, IDAHO.

TRACTION-WHEEL.

No. 866,414.　　　　　Specification of Letters Patent.　　　　Patented Sept. 17, 1907.

Application filed September 25, 1906. Serial No. 336,088.

*To all whom it may concern:*

Be it known that we, ANDREW M. ANDERSON and CORNELIUS QUESNELL, citizens of the United States, residing at Moscow, in the county of Latah and State of Idaho, have invented a new and useful Traction-Wheel, of which the following is a specification.

This invention relates to traction wheels for use in connection with agricultural machines and such as are employed for driving the mechanism of the machine.

The object of the invention is to provide a wheel of durable construction which is provided with means whereby lateral slipping is prevented and whereby said wheel is prevented from slipping in the direction of its movement.

A still further object is to provide novel means for connecting the drive sprocket or gear to the wheel.

With the above and other objects in view the invention consists of a hub to which is connected a rim made up of rings angular in cross section and connected by angular ties which serve to prevent the wheel from slipping in the plane of its movement. The angular rings constituting the rim are so disposed that a broad flat face is formed along the outer portion of the rim while an angular flange is arranged around the inner portion of said rim, said flange and face serving to coöperate to prevent lateral slipping of the wheel by engaging the surface of the ground. The drive sprocket or gear engages one end of the hub and the periphery of this gear is attached to the rim of the wheel by tangentially arranged rods which serve to direct the pressure directly from the rim of the wheel to the rim of the sprocket or gear.

The invention also consists of certain other novel features of construction and combinations of parts which will be hereinafter more fully described and pointed out in the claims.

In the accompanying drawings is shown the preferred form of the invention.

In said drawings: Figure 1 is an elevation of the wheel; Fig. 2 is a transverse section therethrough; and Fig. 3 is an elevation of a portion of a rim showing the side opposite to that illustrated in Fig. 1.

Referring to the figures by characters of reference, 1 is a ring having an inwardly extending flange 2 at one edge thereof and 3 is a similar ring having an outwardly extending annular flange 4 at one edge. The two rings are of the same diameter and are held in parallel planes by diagonally disposed ties 5 formed of angle iron and the flanges 6 all of which extend outward from the ties. Oppositely arranged brace strips 7 connect the rings at desired intervals so as to prevent twisting. All of the ties as well as the brace strips 7 are connected to the rings by rivets or other suitable securing means. A hub 8 extends through the centers of the rings and has enlarged sockets 9 at the ends thereof into which extend spokes 10 which radiate therefrom and are suitably fastened to the rings 1 and 3. The spokes from each socket are secured only to the ring at the same side of the wheel. A sprocket or gear 11 is arranged upon the inner portion of the wheel and has a boss 12 at the center thereof which projects into the inner socket 9. The spokes 13 of this sprocket are disposed substantially at a tangent to the boss 12 so that the strain is transmitted directly from the center of the sprocket to the rim thereof and substantially in the direction of the line of draft. In order that the strain may be transmitted directly from the rim of the wheel to the rim of the sprocket 11, rods 14 are connected at regular intervals to the rim of the gear or sprocket 11 and are disposed at tangents to said rim and fastened to the inner ring 3. By fitting the boss 12 in one of the sockets of the hub it becomes unnecessary to use any fastening means other than the spokes 13 because said spokes will serve not only to transmit the strain from the sprocket to the rim of the wheel but will also clamp the sprocket against the hub of the wheel. It is thought that the advantages of this construction will be clearly apparent to those versed in this art. When the wheel is rotated the flanges of the ties 5 will bite into the ground and prevent the wheel from slipping in the plane of its movement. Should the wheel be upon the side of a hill or other incline the inner flange 4 will engage the soil and prevent lateral movement and this holding action of said flange will be assisted by the flange 2 which constitutes an abutment against which the soil will press. Although the wheel may be of considerable size it will be comparatively light because of the fact that a solid rim is not employed. Not only is the wheel very durable in construction but by disposing the spokes in the manner shown the draft is transmitted directly from the rim of the wheel to the rim of the sprocket or gear 11 and there is no danger of the parts of the wheel becoming twisted.

The preferred form of the invention has been set forth in the foregoing description but we do not limit ourselves thereto as we are aware that modifications may be made therein without departing from the spirit or sacrificing the advantages thereof, and we therefore reserve the right to make such changes as fairly fall within the scope of the claims.

What is claimed is:

1. A wheel of the character described comprising a hub, rings concentric therewith and secured thereto, an inwardly extending annular flange upon the outer edge of one ring, an outwardly extending annular flange upon the outer edge of the other ring, and ties connecting the rings.

2. A wheel of the character described comprising a hub, rings concentric therewith and secured thereto, an inwardly extending annular flange upon the outer edge of one ring, an outwardly extending annular flange upon the outer edge of the other ring, and diagonally arranged ties connecting the rings, each tie having an outwardly extending flange.

3. A wheel of the character described comprising a hub, rings concentric therewith and secured thereto, an inwardly extending annular flange upon the outer edge of one ring, an outwardly extending annular flange upon the outer edge of the other ring, diagonally arranged ties connecting the rings, each tie having an outwardly extending flange, and brace strips connecting the rings.

4. In a wheel of the character described the combination with a hub having enlarged sockets at the ends thereof; of rings surrounding the hub and concentric therewith, means for connecting the inner socket and ring, means for connecting the outer socket and ring, an exterior annular flange at the outer edge of the inner ring, an interior annular flange at the outer edge of the outer ring, and means for rigidly connecting the rings.

5. In a wheel of the character described the combination with a hub having enlarged sockets at the ends thereof; of rings surrounding the hub and concentric therewith, means for connecting the inner socket and ring, means for connecting the outer socket and ring, an exterior annular flange at the outer edge of the inner ring, an interior annular flange at the outer edge of the outer ring, and diagonally disposed ties rigidly connecting the rings and having outwardly extending flanges.

6. A wheel of the character described comprising a hub rings concentric therewith and secured thereto, diagonally disposed angular ties upon the outer face of and connecting the rings, said ties outstanding from the rings and having straight edges disposed to engage the ground, and brace strips secured upon the inner face of the ring and connecting said rings.

7. In a wheel of the character described the combination with a hub having an enlarged socket at one end, and a rim; of a drive gear, a boss at the center thereof seated within the socket, and a plurality of regularly disposed tangential connecting rods secured to the rim of the gear and to the rim of the wheel.

In testimony that we claim the foregoing as our own, we have hereto affixed our signatures in the presence of two witnesses.

ANDREW M. ANDERSON.
CORNELIUS QUESNELL.

Witnesses as to Quesnell:
  C. J. ORLAND,
  S. R. H. McGOWAN.
Witnesses as to Anderson:
  E. HUME TALBERT,
  M. J. WARRINER.